Figure 3:
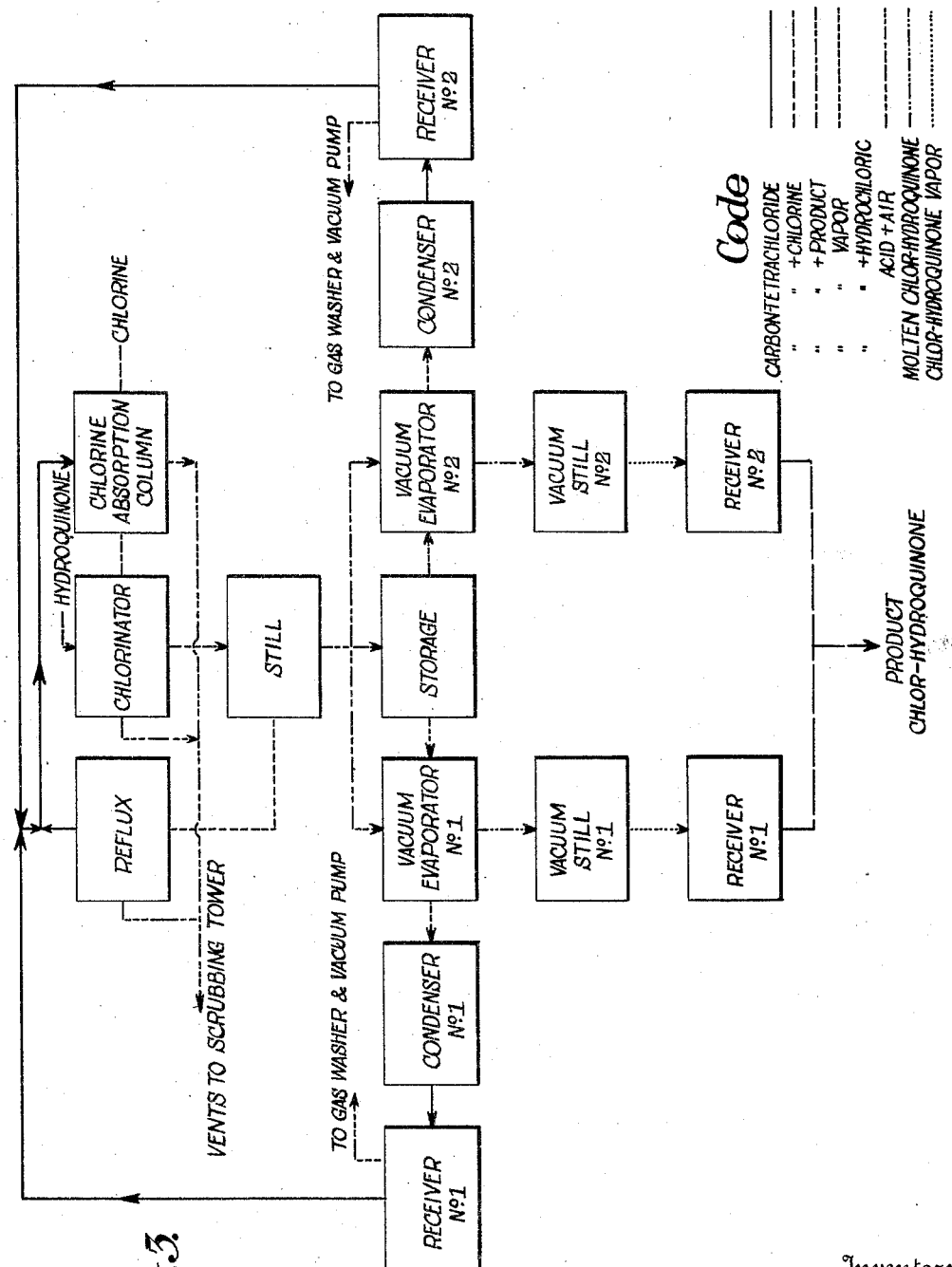

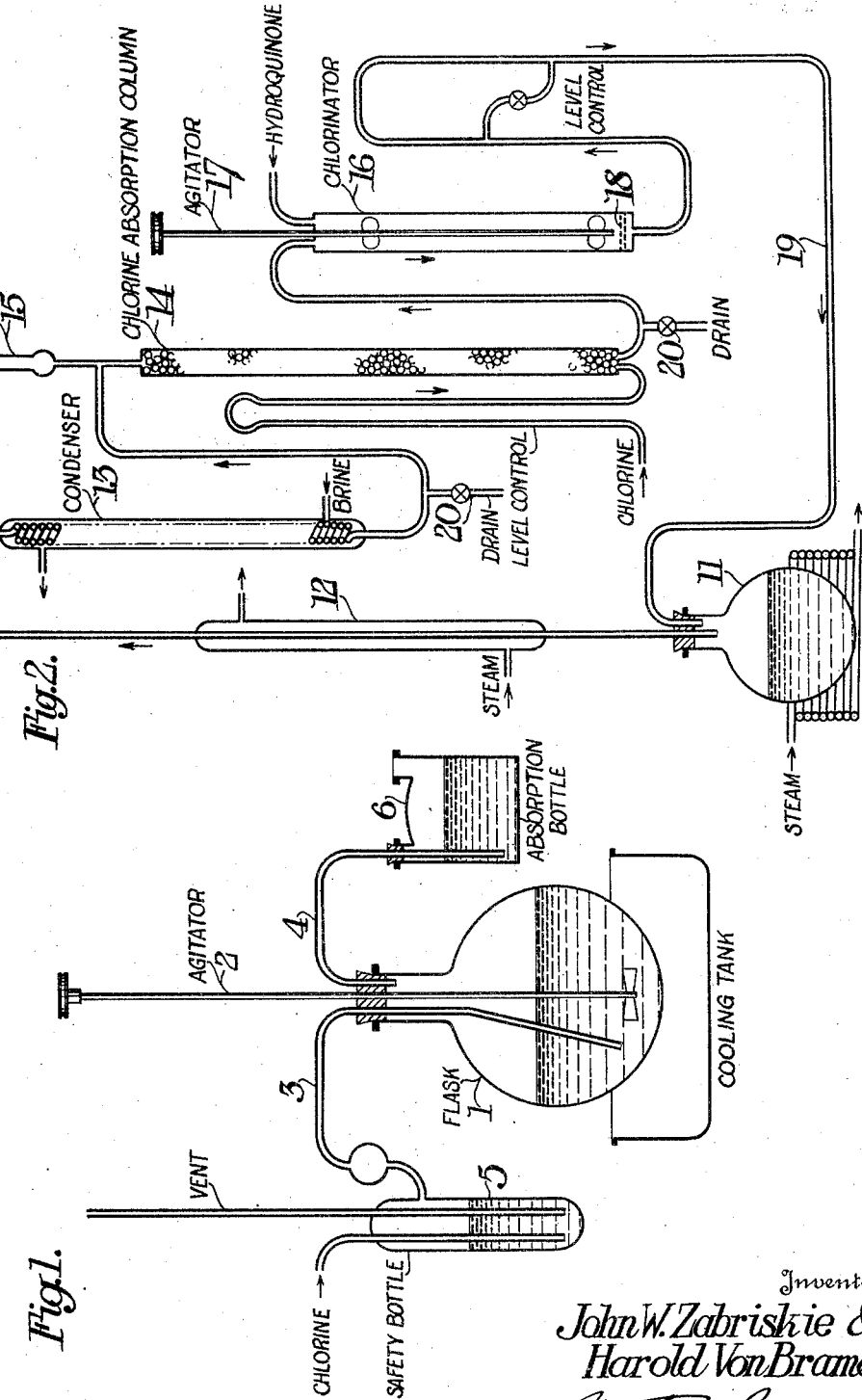

Patented June 6, 1933

1,912,744

UNITED STATES PATENT OFFICE

HAROLD VON BRAMER AND JOHN W. ZABRISKIE, OF KINGSPORT, TENNESSEE, ASSIGNORS TO EASTMAN KODAK COMPANY, OF ROCHESTER, NEW YORK, A CORPORATION OF NEW YORK

MANUFACTURE OF HALOGENATED HYDROQUINONE

Application filed July 13, 1932. Serial No. 622,276.

This invention relates to the manufacture of halogenated hydroquinones. One object of the invention is to provide a process for making chlorinated hydroquinone by the direct chlorination of hydroquinone. Another object is to provide a process for making pure monohalogenated hydroquinones by the direct halogenation of hydroquinone.

Monochlorohydroquinone and monobromohydroquinone are useful, among other things, as photographic developers. Monochlorohydroquinone has usually been prepared by the simultaneous chlorination and reduction of quinone by treating quinone with concentrated hydrochloric acid, or by passing dry hydrogen chloride into a benzene solution of quinone. However, quinone is unpleasant and difficult to work with, on account of its extremely pungent odor and its tendency to become converted into tarry bodies. When attempts were made to chlorinate hydroquinone directly in solution or suspension in water, methanol, benzene, toluene, chloroform, dichlorethane, etc., some of the hydroquinone was oxidized to quinone or quinhydrone, resulting in dark colored products containing much tarry matter.

We have discovered that when hydroquinone is suspended in carbon tetrachloride, it may be chlorinated or brominated directly, without oxidation, by passing chlorine or bromine into the suspension, and furthermore, that if the monohalogenated hydroquinone formed is removed continuously from the reaction mixture, the formation of more highly halogenated products is avoided. Unless the monohalogenated hydroquinone is removed as formed, it is extremely difficult to halogenate all of the hydroquinone without the formation of some dihalogenated hydroquinone.

In making monochlorohydroquinone, if the presence of dichlorohydroquinone in the product is not objectionable, the operation may be carried out in an apparatus, the laboratory form of which is represented in Figure 1. The following is an example of the procedure which may be followed with the apparatus depicted in Fig. 1.

One hundred and ten grams of hydroquinone is ground to a fine powder, and suspended in about 1500 cc. of carbon tetrachloride in a 5-liter flask 1 provided with an agitator 2 and inlet and outlet tubes 3 and 4. A weighed cylinder of chlorine is connected to the inlet tube 3 through a safety bottle 5. The outlet tube 4 is connected to an absorption bottle 6 for taking up the hydrogen chloride evolved in the reaction. Provision is made for cooling the flask with water, and for weighing the chlorine cylinder and the absorption bottle. Over a period of three hours, 71 grams of chlorine is passed into the hydroquinone suspension, with constant agitation. The chlorination is then discontinued. The carbon tetrachloride is evaporated in vacuo and the residue carefully dried, the residue consisting of monochlorohydroquinone together with some dichlorohydroquinone.

When it is desired to obtain pure monochlorohydroquinone, free from more highly chlorinated products, the process may be carried out in an apparatus such as is illustrated diagrammatically in Figure 2, by a continuous process of which the following is illustrative.

Referring to Figure 2, one liter of carbon tetrachloride is placed in the still 11 and evaporation started and continued at a rate of about 70 cc. per minute, the condensed carbon tetrachloride eventually returning to the still through line 19 for re-evaporation. The still may be heated by any suitable means, such as a gas flame, liquid bath or steam. The vapor is led up through the steam jacketed tube 12 and then to brine cooled condensers 13 where it is condensed and the temperature of the condensate lowered to about 0° C. From the condensers 13 the cold carbon tetrachloride passes to the top of the glass-packed absorption column 14 from whence it trickles down through the column and absorbs the chlorine which is fed in at the bottom of the column. Vents, such as the vent 15, in the vicinity of the condensers are provided with calcium chloride tubes or the like to prevent condensation of the moisture from the air in the carbon tetrachloride. Drains 20 may be provided as indicated.

From the absorption column 14, the solution of chlorine in carbon tetrachloride is fed into the chlorinator 16, which is provided with an agitator 17 and a suitable filter 18 containing a filtering medium which is not attacked by the elements treated, such, for instance, as asbestos. At the start of a run, 110 grams of hydroquinone suspended in about two liters of carbon tetrachloride are placed in the chlorinator 16 and agitated; the hydroquinone is insoluble in carbon tetrachloride. The hydroquinone, upon coming in contact with the carbon tetrachloride-chlorine solution fed into the chlorinator, rapidly takes up the chlorine therefrom, forming monochlorohydroquinone which is soluble in carbon tetrachloride; the solution of monochlorohydroquinone thus formed passes through the filter 18 and back to the still 11 by means of the line 19. The head required to filter the solution is regulated by means of the level control in the line 19. The level of the liquid in the chlorine absorption column is regulated by goose necks at the proper level upon each side thereof. When about one-half of the hydroquinone has been chlorinated, and the chlorinated hydroquinone concentrated in the still 11 by the return of the carbon tetrachloride solution of chlorinated hydroquinone and re-evaporation of the carbon tetrachloride in a continuous manner, the operation may be stopped and the hot concentrated solution of monochlorohydroquinone in the still 11 allowed to cool. The crystals which separate out are separated from the mother liquor and dried, the mother liquor being returned to the still 11 to join with further processing. If desired, provision may be made for feeding in hydroquinone and chlorine without interruption and continuously withdrawing the concentrated solution of monochlorohydroquinone without stopping the process, although the latter is a simple and quick step which hardly makes the process discontinuous.

It will be understood that the above examples and the apparatus shown are merely illustrative of two forms of carrying out our invention, and that we are not limited by them. The quantities mentioned may, of course, be varied considerably. For instance, the amount of chlorine absorbed in the carbon tetrachloride or the ratio of this solution to hydroquinone affect the efficiency of the process only and not the fact that it works. While we prefer to carry on the chlorination at temperatures ranging from 0° C. to 25° C., approximately, we may use any temperature from about minus 5° C. up almost to the boiling point of carbon tetrachloride without danger of chlorinating the hydroquinone beyond the monochloro stage, provide the chlorohydroquinone is removed from the reaction mixture substantially as fast as it is formed. Formation of the monochlorohydroquinone is favored by rapid agitation, anhydrous condition of the reaction materials, and a fine state of suspension of the hydroquinone. The apparatus may, of course, be varied to suit the conditions and scale of operation.

A flow sheet representing a method for carrying out the operation on a commercial scale is given in Fig. 3. From this will be observed the preferred form of carrying out the invention, namely, as a completely continuous process. The various pieces of apparatus represented by this flow sheet are, of course, well known to those skilled in the chemical arts and need not be further described. From this flow sheet it will be observed that the carbon tetrachloride continuously flows into the chlorine absorption column and after chlorination flows therefrom into the chlorinator. From the latter, the monochlorohydroquinone solution passes back to the still from whence a proportion of the concentrated solution is continuously withdrawn to storage and evaporators for removal of carbon tetrachloride and drying of the monochlorohydroquinone.

While we have described in detail the method of making monochlorohydroquinone, we have found that monobromohydroquinone may be made in the same manner, under the same conditions, bromine being used in place of chlorine. Where weights of halogen are referred to, approximately 160 g. of bromine is used in place of approximately 71 g. of chlorine.

What we claim as our invention and desire to be secured by Letters Patent of the United States is:

1. A process of making chlorinated hydroquinone, which comprises treating hydroquinone submerged in carbon tetrachloride with chlorine.

2. A process of making monochlorohydroquinone, comprising suspending hydroquinone in carbon tetrachloride and treating it with chlorine.

3. A process of making monohalogenated hydroquinone, comprising suspending hydroquinone in carbon tetrachloride, treating it with a haolgen selected from the group consisting of chlorine and bromine, and continuously removing the monohalogenated hydroquinone from the reaction mixture.

4. A process of making monochlorohydroquinone, comprising suspending hydroquinone in carbon tetrachloride, treating it with chlorine, and continuously removing the monochlorohydroquinone from the reaction mixture.

5. A process of making monobromohydroquinone, comprising suspending hydroquinone in carbon tetrachloride, treating it with bromine, and continuously removing the monobromohydroquinone from the reaction mixture.

6. A process of chlorinating hydroquinone which comprises treating hydroquinone with carbon tetrachloride containing dissolved chlorine.

7. A process of halogenating hydroquinone which comprises treating hydroquinone with carbon tetrachloride containing a dissolved halogen selected from the group consisting of chlorine and bromine and removing the halogenated hydroquinone from the hydroquinone substantially as fast as formed.

8. A process of chlorinating hydroquinone which comprises treating hydroquinone with carbon tetrachloride containing dissolved chlorine and removing the chlorinated hydroquinone from the hydroquinone substantially as fast as formed.

9. A process of brominating hydroquinone which comprises treating hydroquinone with carbon tetrachloride containing dissolved bromine and removing the brominated hydroquinone from the hydroquinone substantially as fast as formed.

10. A continuous process of making monochlorohydroquinone which comprises distilling carbon tetrachloride from a still, passing it through a chlorinator to which chlorine is admitted, passing the carbon tetrachloride containing chlorine into a mixer containing hydroquinone suspended in carbon tetrachloride, returning the carbon tetrachloride containing dissolved monochlorohydroquinone to the still, and redistilling the carbon tetrachloride.

Signed at Kingsport, Tennessee, this 5th day of July, 1932.

HAROLD VON BRAMER.
JOHN W. ZABRISKIE.